United States Patent [19]

Hwang et al.

[11] Patent Number: 4,834,063
[45] Date of Patent: May 30, 1989

[54] FOOD COOKING OVEN WITH DUCT FINGERS AND METHOD

[75] Inventors: Yong Y. Hwang, Huron, Ohio; Donald P. Smith, Dallas, Tex.

[73] Assignee: Stein Associates, Inc., Sandusky, Ohio

[21] Appl. No.: 55,127

[22] Filed: May 28, 1987

[51] Int. Cl.$^4$ .............................................. A21B 21/00
[52] U.S. Cl. .............................. 126/21 A; 99/443 R; 99/474; 126/41 C; 126/41 R
[58] Field of Search ............... 126/21 A, 21 R, 41 R, 126/41 A, 41 B, 41 C; 34/218; 99/443, 467, 474

[56] References Cited

U.S. PATENT DOCUMENTS

| | | | |
|---|---|---|---|
| 784,854 | 3/1905 | Grace | 126/21 A |
| 2,767,667 | 10/1956 | Spooner . | |
| 2,908,235 | 10/1959 | Naylor et al. | 107/63 |
| 3,199,224 | 8/1965 | Brown . | |
| 3,262,217 | 7/1966 | Brown et al. . | |
| 3,263,339 | 8/1966 | Brown et al. . | |
| 3,398,466 | 8/1968 | Brown . | |
| 3,398,467 | 8/1968 | Brown . | |
| 3,884,213 | 5/1975 | Smith . | |
| 3,908,533 | 9/1975 | Fagerstrom et al. . | |
| 4,089,260 | 5/1978 | Brown . | |
| 4,121,509 | 10/1978 | Baker et al. . | |
| 4,154,861 | 5/1979 | Smith . | |
| 4,289,792 | 9/1981 | Smith . | |
| 4,338,911 | 7/1982 | Smith . | |
| 4,377,109 | 3/1983 | Brown et al. . | |
| 4,409,453 | 10/1983 | Smith . | |
| 4,438,572 | 3/1984 | Kaminski | 34/218 |
| 4,462,383 | 7/1984 | Henke et al. . | |
| 4,576,090 | 3/1986 | Burtea | 99/443 C |
| 4,679,542 | 7/1987 | Smith et al. | 126/21 A |

FOREIGN PATENT DOCUMENTS 1048030 12/1953 France .

OTHER PUBLICATIONS

International Application (PCT) WO85/05546-12/19/85.
Jet Zone by Wolverine Corporation.
The Impinger Oven by Lincoln Manufacturing Company, Inc:, 1984.
Typical Recirculating And Non-Circulating Oven by Eclipse Fuel Engr. Co., Rockford, Illinois, 1970.
The Thermal Jet by Bellas Food Engineering, Inc.
Recirculating Heat Oven by Werner LeHara.
Oven Developments The Forced Convection Oven by Spooner Food Machinery Engr. Co. Ltd.
Heat Transfer by High Velocity Air Streams in Industrial Furnace, American Society of Mechanical Engineers, 8/25/61.

*Primary Examiner*—Larry Jones
*Attorney, Agent, or Firm*—Baldwin, Egan & Fetzer

[57] ABSTRACT

An oven for cooking food products comprising a substantially closed enclosure except for an inlet and an outlet in the end walls of the oven. A heater means extends through the top wall of the enclosure into the cooking chamber for producing a gaseous cooking medium and suction fan means are provided on the enclosure top wall on either side of the heater means and in relatively closely spaced relation to the outlet of the heater means, and a source of moisture is disposed between the heater means outlet and the suction side of each of the fans for mixing moisture with the heated medium from the heater means. A conveyor is adapted to receive food products and move the products through the oven from the inlet to the outlet thereof, and duct fingers are provided both above and below the conveyor for directing and impinging the heated gaseous cooking medium onto the food products being moved by the conveyor through the oven. A second chamber separate from the cooking chamber is provided in communication with the pressure side of each of the fans and connected to the duct fingers for directing the mixture of heated gaseous medium and moisture withdrawn from the cooking chamber by the fans to the duct fingers to then be applied thereby to the food product. Recycling of the cooking medium is accomplished and the oven is so constructed that cleaning thereof is materially facilitated. A novel method of mass cooking of food product is also disclosed.

33 Claims, 13 Drawing Sheets

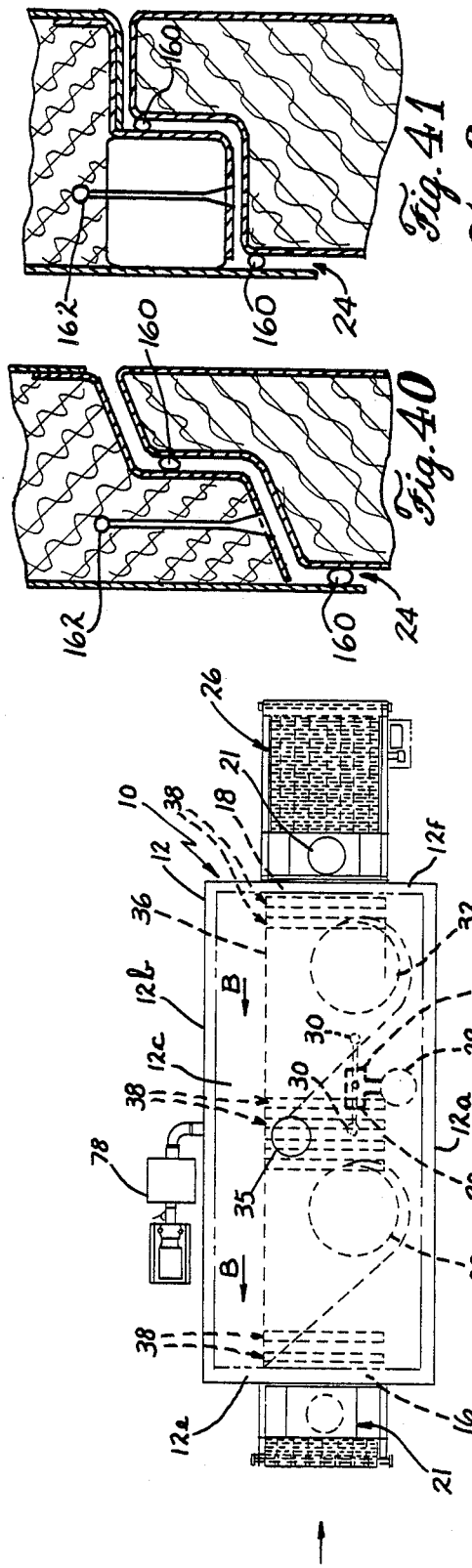

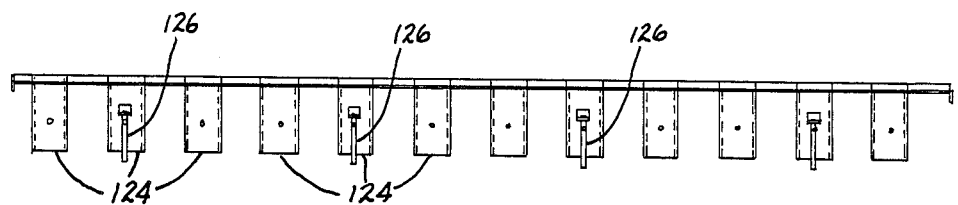
Fig. 6
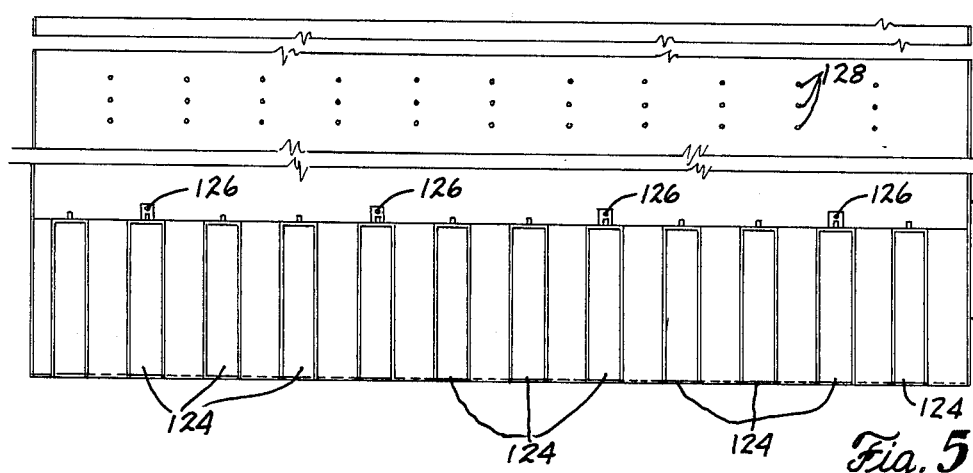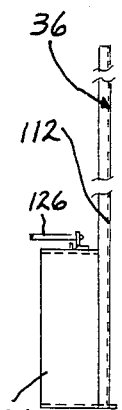
Fig. 5    Fig. 7
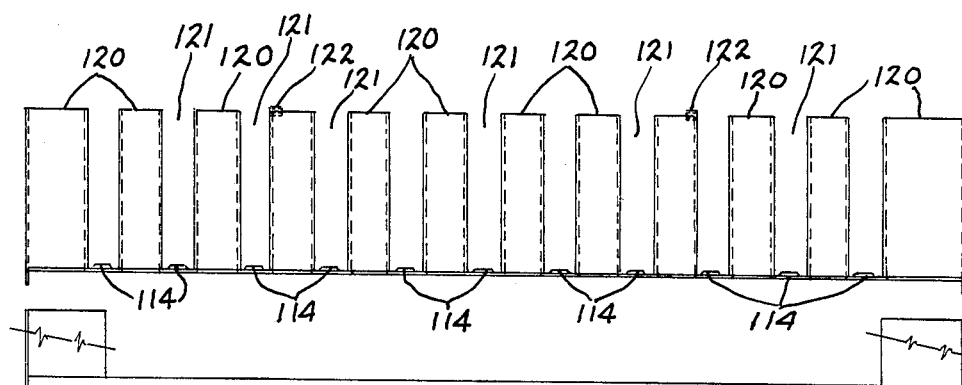
Fig. 9
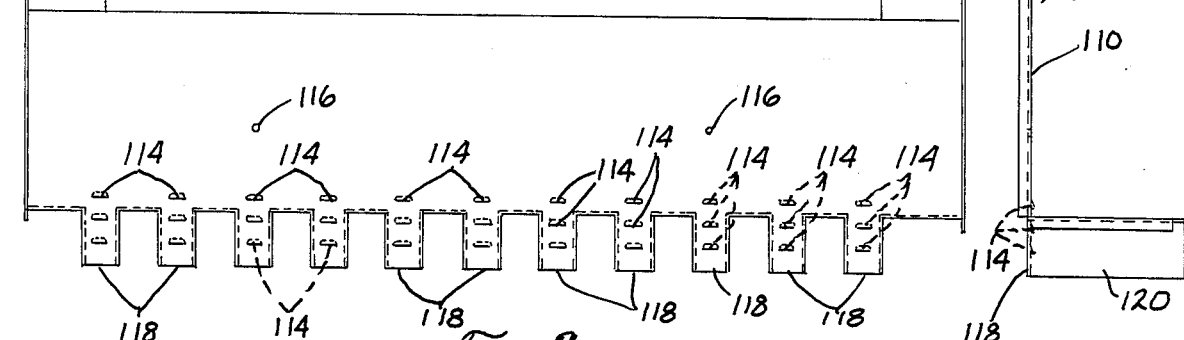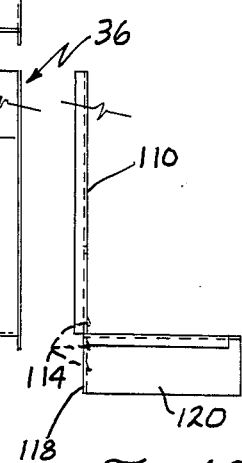
Fig. 8    Fig. 10

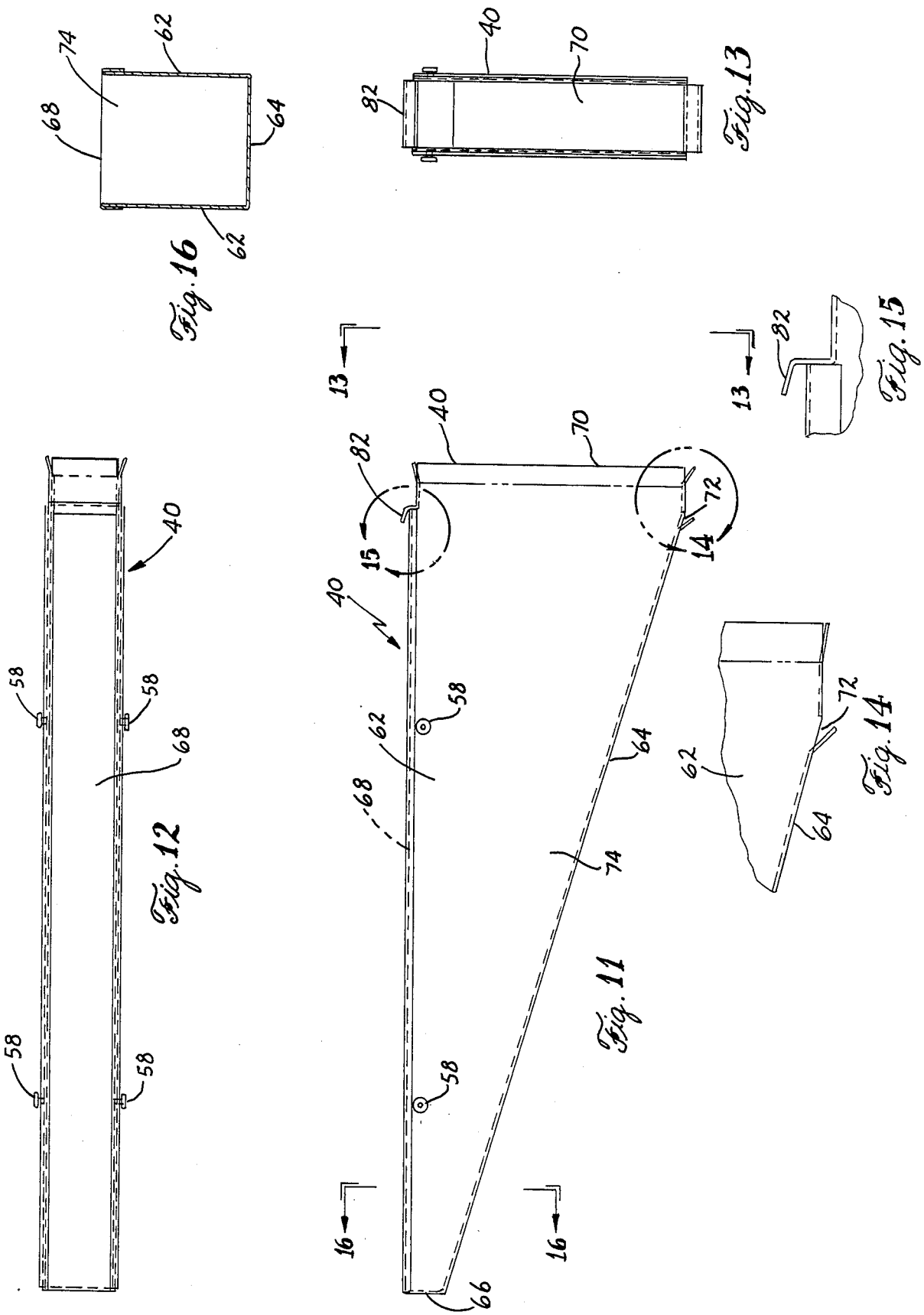

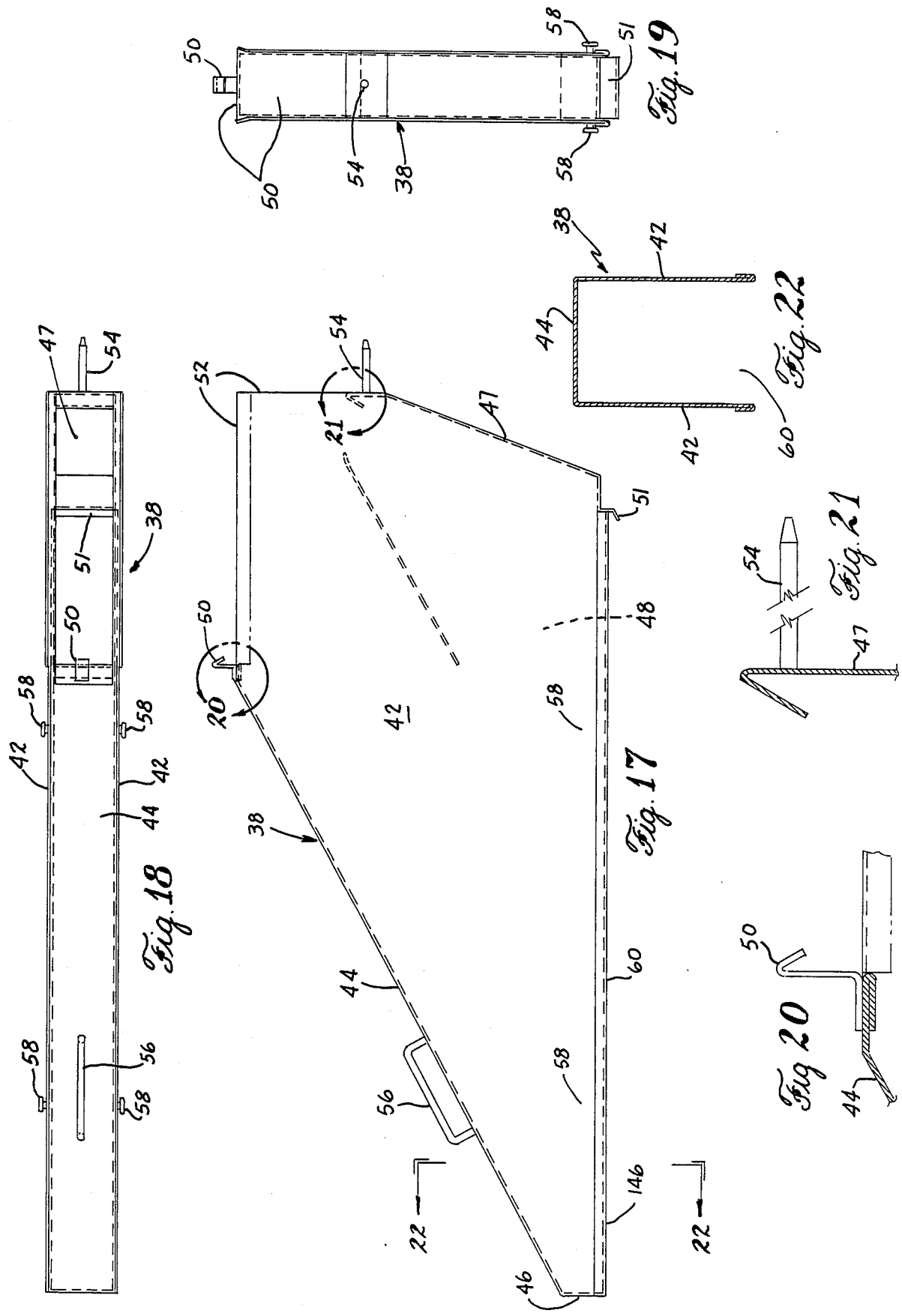

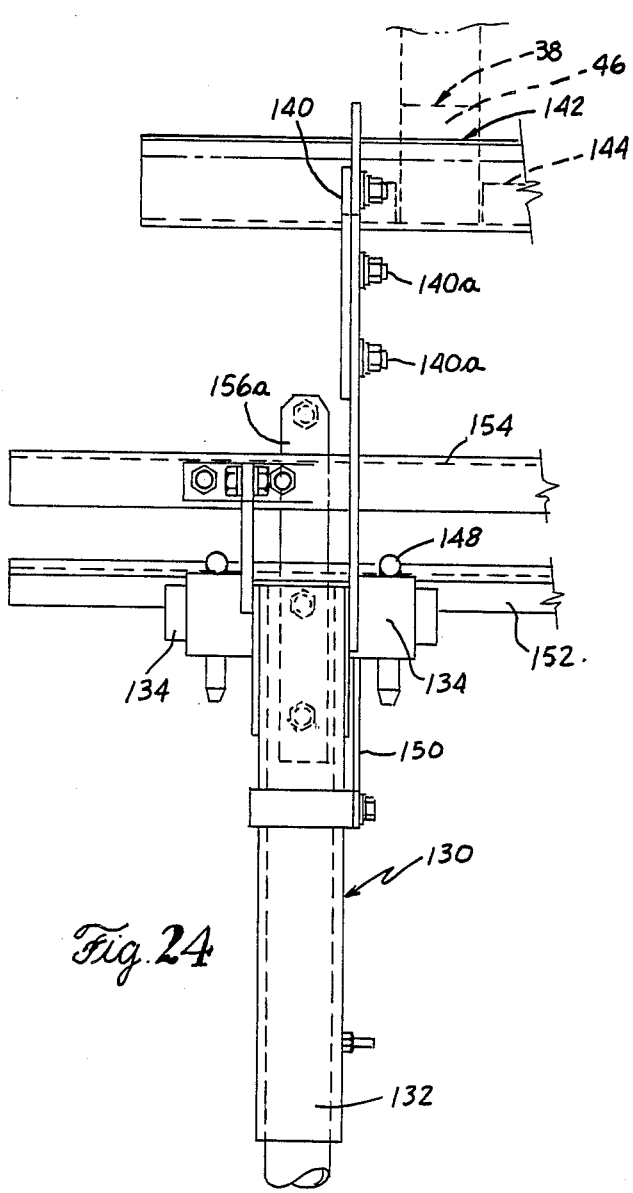
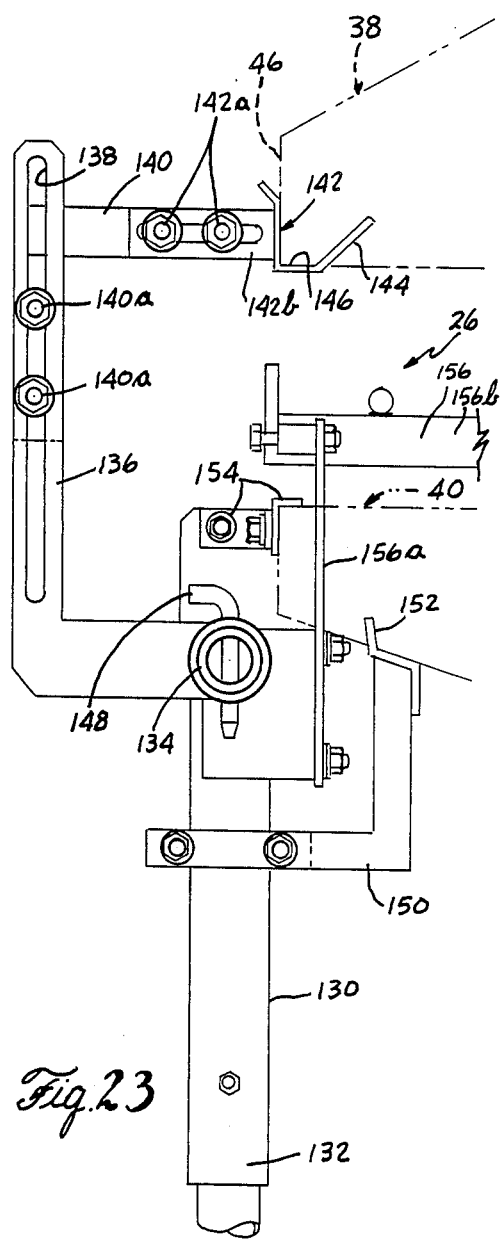
Fig. 24
Fig. 23

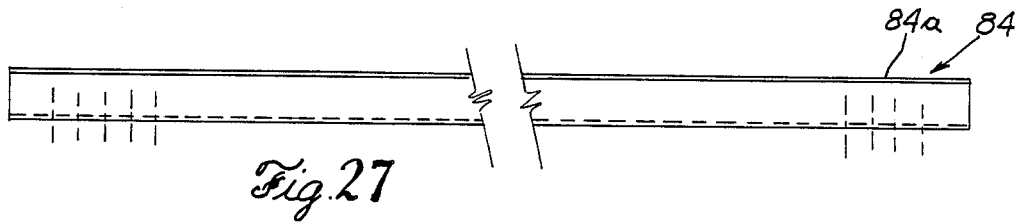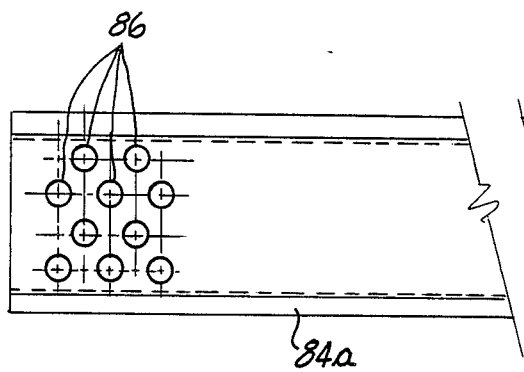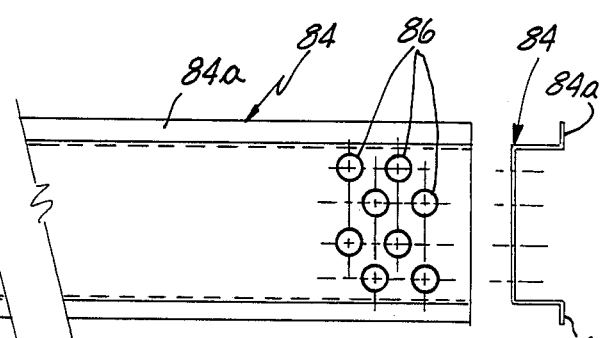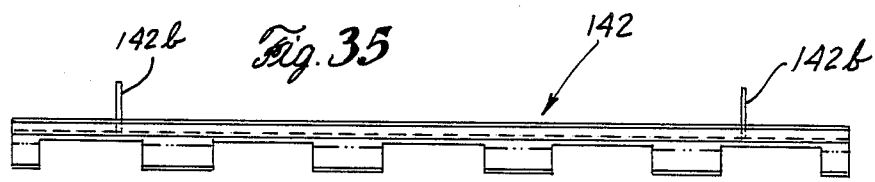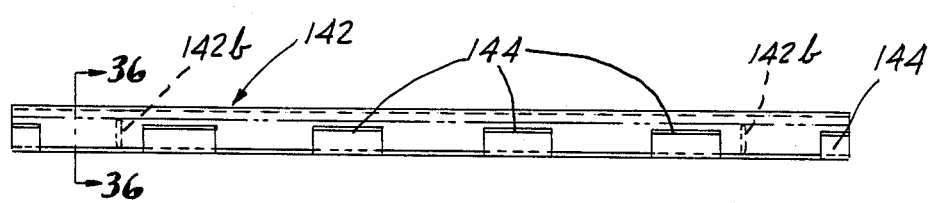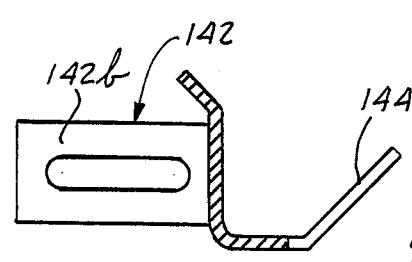

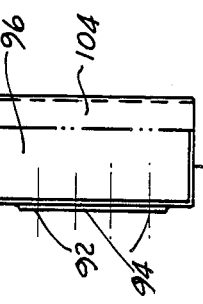
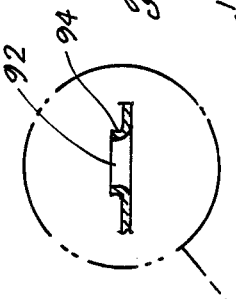
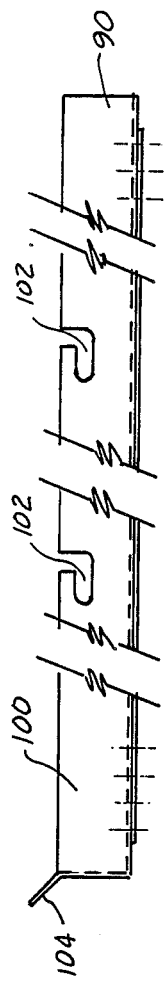
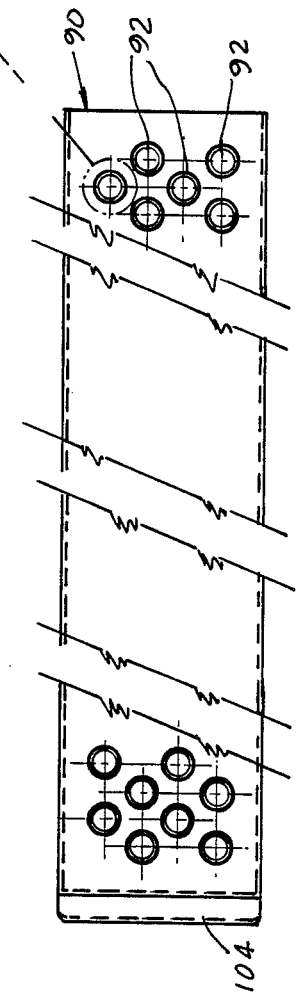
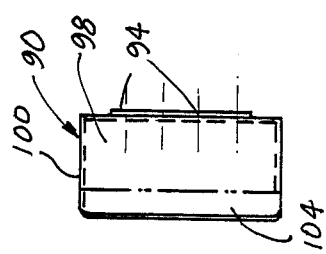

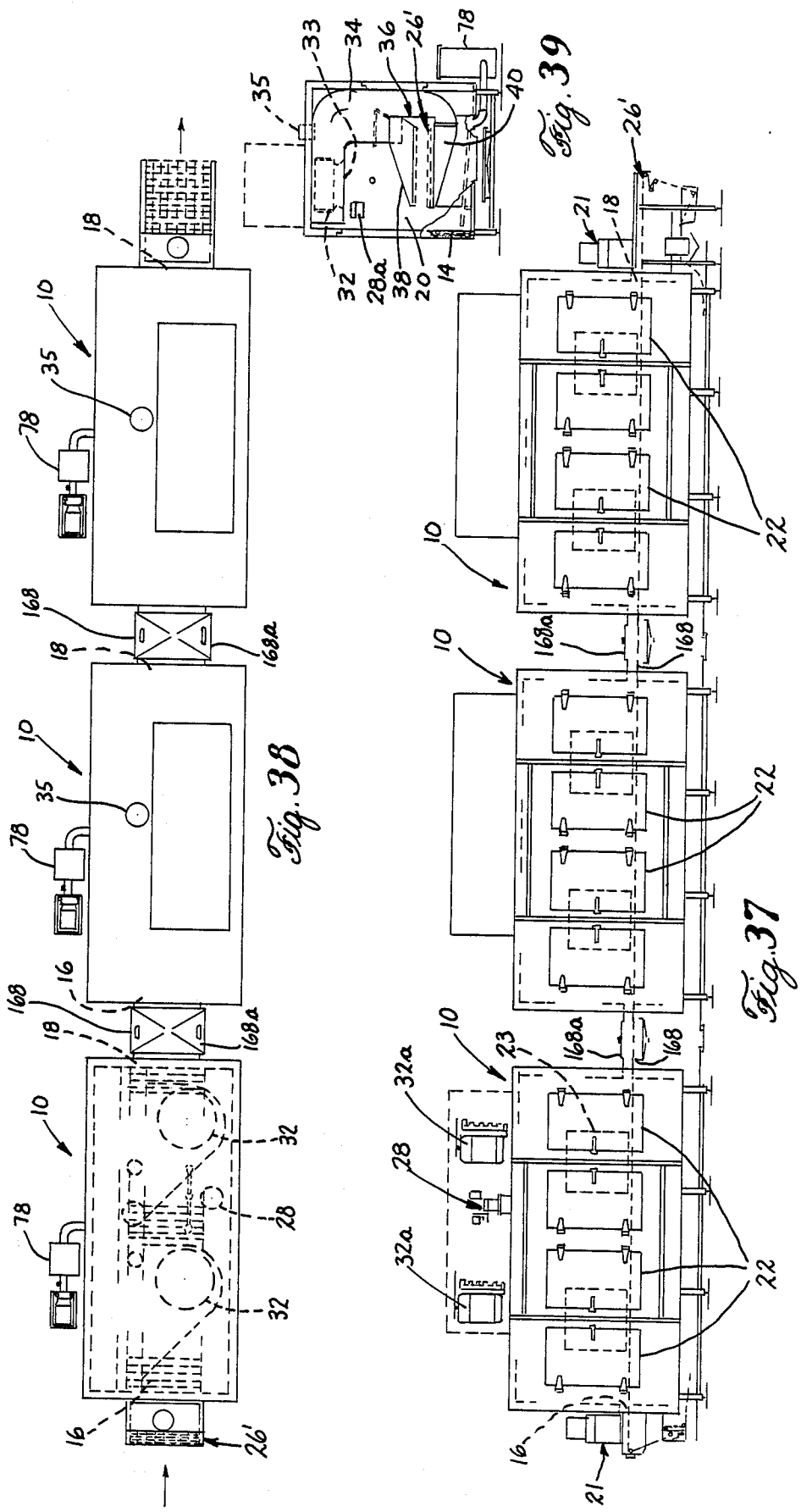

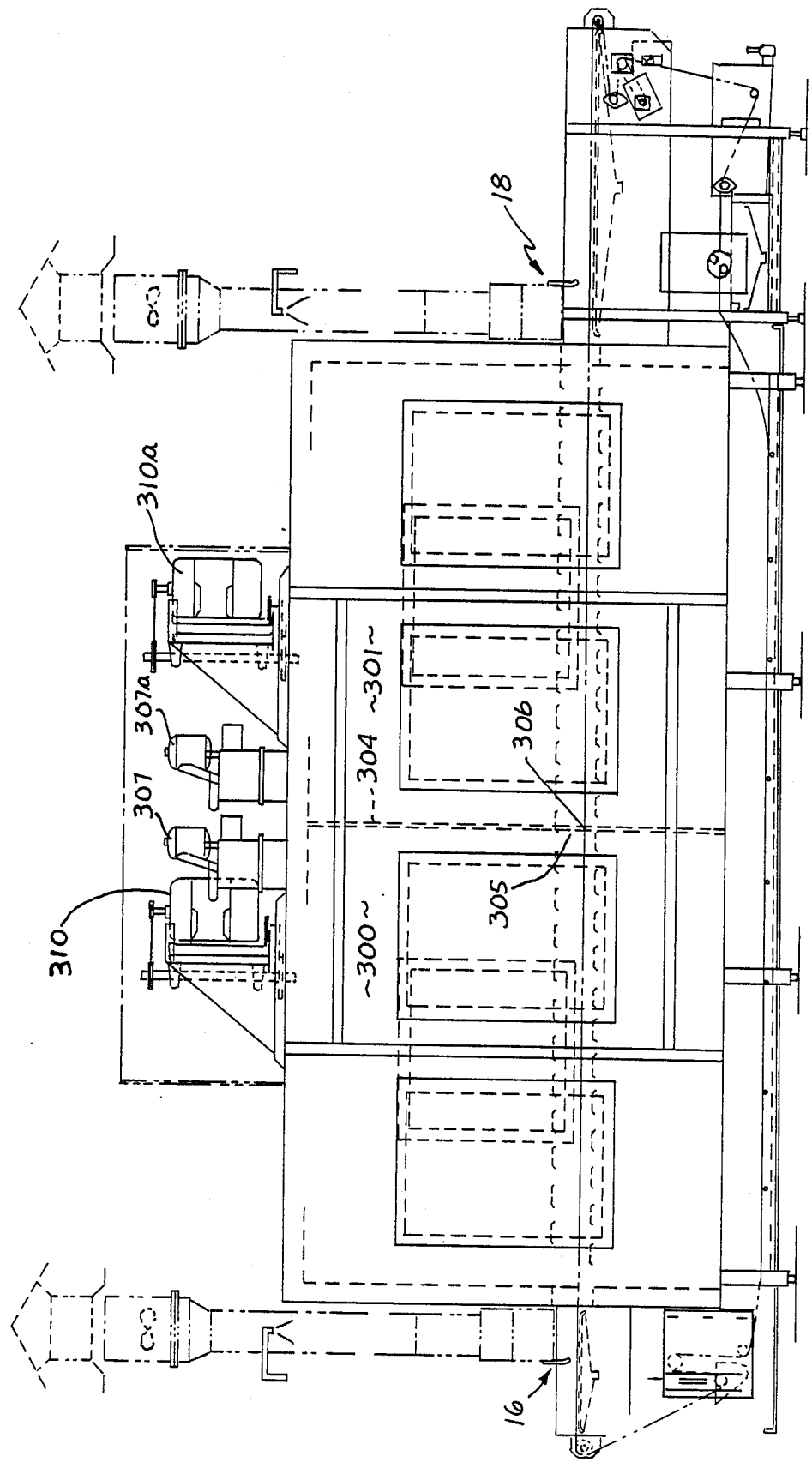

FOOD COOKING OVEN WITH DUCT FINGERS AND METHOD

This invention relates in general to ovens and associated method for mass cooking of food, and more particularly to an oven wherein the gaseous heating or cooking medium is applied to the food on a movable conveyor through the oven via spaced duct fingers which are disposed above and below the conveyor, for jet impingement of the cooking medium onto the food products on the conveyor, and wherein a mixture of moisture and gaseous cooking medium is produced and then circulated via spaced suction fan means in the upper portion of the oven to the duct fingers disposed at a lower elevation for expeditiously performing the cooking operation, with the cooking medium then being recirculated back through the oven and mixed with newly produced cooking medium via the fan means.

BACKGROUND OF THE INVENTION

Food cooking ovens embodying conveyors extending therethrough for conveying food product during the cooking thereof are well known in the art. Many different types and styles of ovens are available for cooking various types of food products.

U.S. Pat. No. 4,462,383 dated July 31, 1984 discloses a small type convection oven utilized for instance in cooking pizza, sandwiches and the like, and wherein impingement duct fingers are utilized for applying gaseous heating or cooking medium to the food product disposed on a conveyor, with the duct fingers being disposed above and below the conveyor mechanism. However, such patent disclosure relates to a relatively small size oven and not to the type of oven of the present invention which relates to a relatively large oven for mass cooking of food product, and whereby the cooking medium for cooking the food product is effectively mixed with a supply of moisture preparatory to applying the cooking medium to the food product utilizing impingement type duct fingers.

SUMMARY OF THE INVENTION

The present invention provides a convection cooking oven which utilizes a plurality of spaced impingement type duct fingers disposed above and below the conveyor mechanism of the oven, for applying the gaseous cooking medium to the food product on the conveyor, and wherein a heater means is provided on the top wall of the oven enclosure extending into the cooking chamber for supplying the heated gaseous medium for the cooking operation, with moisture supplying means disposed in relatively close relation to the outlet of the heater means so that moisture can be applied to the cooking medium produced by the heater means, and then suction fan means are disposed on opposite sides of the heater means outlet duct for drawing the moisturized cooking medium produced by the heater means upwardly out of the cooking chamber and then downwardly to the lower disposed duct fingers, with the pressure side of the fans being disposed in a separate chamber from the cooking chamber, thus directing the mix of moisturized cooking medium to the duct fingers in an expeditious manner, for optimal cooking the food product disposed on the conveyor running intermediate the upper and lower duct fingers. The heated gaseous medium cooks the food product and then is recirculated via the aforementioned fans back and mixed with newly produced cooking medium from the heater means for once again being applied via the duct fingers to cook food product. The end result is an efficient convection type cooking oven for mass cooking of food product, and one that is especially readily cleanable.

Accordingly, an object of the invention is to provide a novel oven for cooking food products and one that efficiently utilizes the convection cooking process in conjunction with impingement type duct fingers, for efficient mass cooking of food product.

A still further object of the invention is to provide an oven of the aforementioned type wherein moisture is expeditiously mixed with the heated cooking medium produced by a heater mounted on the top of the oven enclosure so that when the moisturized cooking medium is applied to the food product by the impingement duct fingers, the cooking medium is adequately moisturized, resulting in improved cooking of various kinds of food product.

A still further object of the invention is to provide an oven of the aforementioned type wherein the oven can be effectively and rapidly cleaned and wherein drippings from the food product are continuously urged or drained outwardly of the oven.

A still further object of the invention is to provide an oven of the aforementioned type wherein at least certain of the duct fingers are adjustable vertically relative to the food product conveyor so that the distance between the jet streams of cooking medium flowing from said certain duct fingers onto the food product can be selectively varied.

Another object of the invention is to provide a novel method for large scale production of cooked food products.

Other objects and advantages of the invention will be apparent from the following description taken in conjunction with the accompanying drawings wherein:

BRIEF DESCRIPTION OF THE DRAWINGS

FIG. 1 is a side elevational view of a convection type food cooking oven embodying the invention;

FIG. 2 is a somewhat diagrammatic top plan view of the oven of FIG. 1;

FIG. 3 is a partially broken, generally diagrammatic enlarged sectional view taken in general along the plane of line 3—3 of FIG. 1, and illustrating the connection of the upper and lower duct fingers in the interior of the oven to the suction fan means which circulates the cooking medium from the heater to the duct fingers for impingement upon the food product disposed on the intermediate conveyor, and then operable to recirculate the gaseous medium back from the cooking chamber for recycling;

FIG. 5 is a broken, elevational view of the lower portion of the divider wall of the oven which is adapted to support thereon the aforementioned duct fingers;

FIG. 6 is a top plan view of the divider wall portion of FIG. 5;

FIG. 7 is a broken end elevational view of the divider wall portion of FIGS. 5 and 6 taken from the right hand end of FIG. 5;

FIG. 8 is a partially broken elevational view of the upper portion of the divider wall utilized in the oven of the invention, and showing the arrangement for adjustably changing or varying the position of the upper duct fingers as mounted on such upper divider wall portion;

FIG. 9 is a top plan view of the divider wall portion of FIG. 8;

FIG. 10 is a broken end elevational view of the divider wall portion of FIG. 8 taken from the right hand end thereof;

FIG. 11 is an enlarged, side elevational view of one of the lower duct fingers utilized in the oven of the invention;

FIG. 12 is a top plan view of the FIG. 11 finger structure;

FIG. 13 is an end elevational view of the FIG. 11 finger taken generally along the plane of line 13—13 of FIG. 11 looking in the direction of the arrows;

FIG. 14 is an enlarged fragmentary view of the lower end portion of the FIG. 11 finger, and identified by reference number 14;

FIG. 15 is an enlarged fragmentary view of the upper portion of the FIG. 11 finger as illustrated by reference number 15 in FIG. 11;

FIG. 16 is an enlarged, sectional view taken generally along the plane of line 16—16 of FIG. 11 looking in the direction of the arrows;

FIG. 17 is an enlarged, side elevational view of one of the upper duct fingers utilized in the oven of the invention;

FIG. 18 is a top plan view of the FIG. 17 structure;

FIG. 19 is an end elevational view of the FIG. 17 duct finger taken from the right hand end thereof;

FIG. 20 is an enlarged sectional view taken from the upper end of the FIG. 17 duct finger, and as referred to by reference number 20 in FIG. 17;

FIG. 21 is an enlarged partially broken, sectional view of the portion of the duct finger of FIG. 17 referenced by number 21 in FIG. 17;

FIG. 22 is an enlarged, vertical sectional view taken generally along the plane of line 22—22 of FIG. 17 looking in the direction of the arrows;

FIG. 23 is an enlarged, fragmentary view of the support structure for the outer ends of the duct fingers and as illustrated in FIG. 4;

FIG. 24 is a fragmentary end elevational view taken from the left hand end of FIG. 23;

FIG. 26 is a broken plan view of a columnating plate adapted for mounting with a respective of the duct fingers along the open channel thereof for producing the jets of cooking medium via the duct fingers, for impingement on the food product on the conveyor;

FIG. 27 is a side elevational view of the columnating plate of FIG. 26;

FIG. 28 is an end elevational view of the FIG. 26 columnating plate taken generally from the right hand end thereof;

FIG. 29 is a partially broken top plan view of a jet plate adapted for coaction with the columnating plate of FIG. 26 in the production of the jets of cooking medium, and adapted for assembly with a respective duct finger;

FIG. 30 is a side elevational view of the jet plate of FIG. 29;

FIG. 31 is an end elevational view of the FIG. 29 jet plate taken from the right hand end thereof;

FIG. 32 is an end elevational view of the FIG. 29 jet plate taken from the left hand end thereof;

FIG. 33 is an enlarged fragmentary illustration of one of the jet orifices in the FIG. 29 jet plate;

FIG. 34 is a side elevational view of one of the track members utilized to aid in supporting the outer ends of the duct fingers in conjunction with the support structure of FIGS. 23 and 24;

FIG. 35 is a top plan view of the track member of FIG. 34;

FIG. 36 is an enlarged, sectional view taken generally along the plane of line 36—36 of FIG. 34, looking in the direction of the arrows;

FIG. 37 is a side elevational view of an embodiment of the invention utilizing a plurality of the oven structures of FIGS. 1 through 36 arranged in tandem, and with the outlet end of one oven connected to the inlet end of the confronting oven so that the food product can be passed through any desired number of the ovens of the invention;

FIG. 38 is a generally diagrammatic top plan view of the FIG. 37 embodiment;

FIG. 39 is a diagrammatic partially broken and sectioned end view of the FIGS. 37 and 38 embodiment;

FIG. 40 is a diagrammatic illustration of a sealing means arrangement utilized in conjunction with access doors of the oven for effectively sealing the access doors against the emission of cooking medium from the oven enclosure;

FIG. 41 illustrates another embodiment of such access door sealing means arrangement;

FIG. 42 is a front elevational view of an alternate embodiment of oven in which there are two separate cooking chambers each having its own heating source, moisture and air flow systems;

DESCRIPTION OF PREFERRED EMBODIMENT AND ALTERNATE EMBODIMENT

Figure 4:
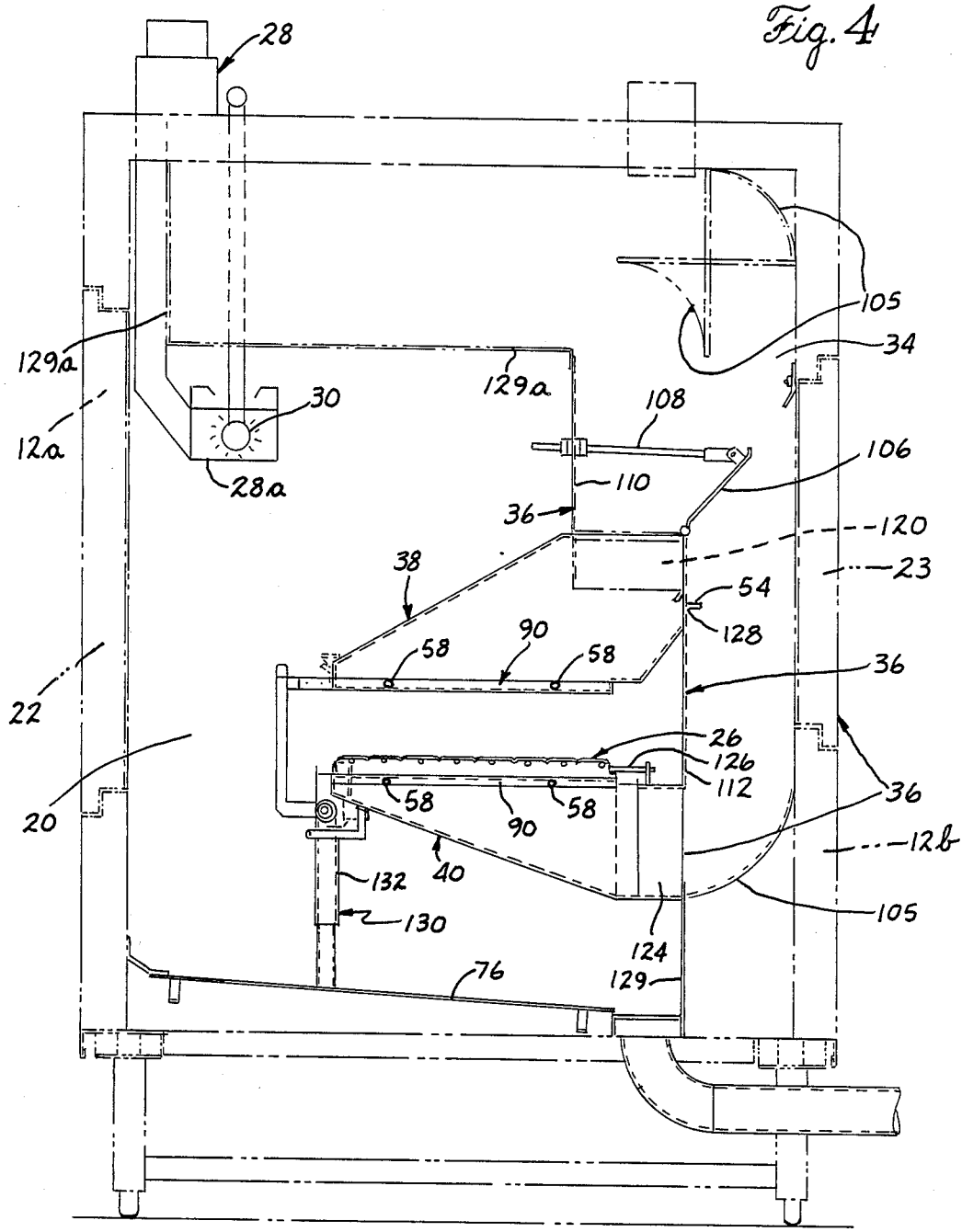
FIG. 4 is an enlarged sectional view generally similar to FIG. 3 and illustrating some of the details of supporting the mounted duct fingers of the oven at their outer ends, and also illustrating details of the baffle means utilized in the oven for directing the flow of gaseous medium to the duct fingers.

The cooking oven 10 of the invention comprises an enclosure 12 formed of side walls 12a, 12b, top wall 12c, bottom wall 12d and end walls 12e and 12f to define the oven enclosure. The walls of the enclosure are preferably double walls having an interior insulation 14. The end walls 12e and 12f have respectively an inlet opening 16 and an outlet opening 18 therein, through which openings food product are introduced into and removed from the oven. Such openings are preferably small as feasible to retard the egress of heated medium from interiorly of the cooking chamber 20 in the oven enclosure. Exhaust stack structure 21 of conventional known type may coact with the oven inlet and outlet openings 16 and 18, in the conventional known manner.

In the embodiment illustrated, side wall 12a includes a plurality (as shown four) access doors 22 therein for providing for convenient access to the interiorly of the oven for maintenance and cleaning thereof. Side wall 12b also, in the embodiment illustrated, includes access doors 23 (in the embodiment illustrated two) for providing for convenient access to the oven enclosure. Sealing means 24 coact between the respective side wall and the respective of said doors for sealing the doors against egress of pressurized cooking medium from interiorly of the oven. The details of such sealing means 24 will be hereinafter described.

A conveyor means 26 which in the embodiment illustrated is an endless pervious conveyor mechanism, extends through the oven from the inlet 16 thereof and passes out the outlet 18 thereof. Conveyor 26 is powered in a conventional manner by means of a motor (preferably a hydraulic motor) and is operative to move food product through the oven in the accomplishment of the cooking thereof.

A heater 28 is mounted on the top wall 12c of the oven, and may comprise a known combination of gas burner and blower unit, for furnishing gaseous cooking medium operable for cooking the food product passing through the oven from the left hand end to the right hand end thereof, and in the direction of the full line arrow shown in FIGS. 1 and 2.

Referring now again to FIG. 1, the T duct outlet ports 28a of the heater 28 may be provided as illustrated in FIGS. 1 and 2, with each of such heater outlet ports being disposed in relatively close relationship to a source of moisture (e.g. steam spray outlets 30) for supplying predetermined amounts of moisture to the gaseous medium being furnished by the heater 28.

Disposed on either side of the heater 28 is a large suction fan 32, which may be driven as by means of an associated electric motor 32a (FIG. 1) operatively coupled to the respective fan. The suction side 33 of each fan 32 as can be best seen in FIGS. 2 and 3 is disposed in relatively close relationship to the respective discharge duct port 28a of the heater 28, and to the moisturizing supply means 30, so that as the heated medium from heater 28 is discharged at or adjacent to the moisturizing means 30, the fan 32 sucks such heated medium and moisture from the upper portion of the cooking chamber 20, and discharges it into the plenum chamber 34 in the oven which is completely separate from the heating chamber 20, and which is adapted to transfer the heated and moisturized heating medium to the lower elevation duct fingers disposed on opposite sides of the conveyor means 26, and as will be hereinafter described in detail.

Exhaust stack 35 of relatively small size may be provided extending through top wall 12c and communicating with plenum chamber 34. Stack 35 preferably embodies baffle means (not shown) for selectively restricting or preventing the egress of gaseous medium up the stack 35.

Plenum chamber 34 is separated from the cooking chamber 20 by means of vertical divider wall means 36, on which are supported the upper duct fingers 38 and the lower duct fingers 40, such upper and lower finger ducts being spaced relative to one another in a direction lengthwise of the oven, and being disposed on opposite sides of the conveyor means 26 for applying gaseous cooking medium to food products on the moving conveyor mechanism to cook the food products, and as will be hereinafter described in detail.

Referring now in particular to FIGS. 17 through 22, each of the upper duct fingers 38 comprises a fabricated sheet metal member preferably made of stainless steel and having polygonal shaped side walls 42, a sloping top wall 44, a generally vertical outer end wall 46 and a diagonal inner end wall 47 defining a chamber 48 adapted to receive heated air from the pressure side of the fans 32 via plenum chamber 34, and as will be hereinafter described in greater detail.

The top of each duct finger 38 is provided with a hook shaped member 50 which is used for hanging the duct finger on the aforementioned divider wall 36, and the bottom is provided with a tab 51 adapted to receive an end of a coacting jet plate member, and as will be hereinafter described in greater detail. The respective finger is open as at 52 and each duct finger is adapted to coact with duct work on the aforementioned divider wall 36 (FIGS. 8 to 10) as will be hereinafter described in greater detail.

Projecting rearwardly from end wall 47 of the duct finger is a pin 54 which is adapted to be received in a complementary opening in the divider wall 36. A handle 56 may be provided on the top sloping wall 44 to aid in handling the duct finger and aid in mounting them onto the divider wall 36 and for removal of the duct fingers from the divider wall, when it is desired to thoroughly clean the oven. Projecting laterally from each of the side walls 42 of the duct finger are a plurality of headed pins 58 which are adapted for coaction with slots in a jet plate (FIGS. 29-33) fitted about the open bottom 60 of the duct finger, and as will be described hereafter in detail.

Referring now to FIGS. 11 through 16, each of the lower duct fingers 40 comprises generally triangular shaped side walls 62, a generally sloping bottom wall 64, and a generally vertical end wall 66 with the top of the duct finger being open as at 68 and also being open at the right hand end 70 thereof.

Sloping bottom wall 64 preferably has an opening 72 (FIG. 14) formed therein for permitting drippings falling down from the conveyor into the chamber 74 defined by the duct finger, to flow out of the duct finger onto the sloping bottom wall surface 76 (FIGS. 3 and 4) of the cooking chamber. From such sloping bottom wall surface (which is preferably water cooled as at 77) the drippings are adapted to flow toward the right hand side of the oven (as viewed in FIGS. 3 and 4) to a drain 78a and thence to a catch box 78 of conventional type, adapted to receive such drippings.

The side walls 62 of lower duct finger 40 preferably has headed pins 58 projecting outwardly therefrom, similarly to the upper duct fingers, and adapted for receiving a slotted jet plate similarly to the upper duct finger. The top of the rearward end portion of each duct finger 40 is preferably provided with a hook shaped member 82 adapted for coacting with the aforementioned jet plate. Duct finger 40 is adapted to be removably mounted on duct means on the aforementioned divider wall 36 for hanging the duct finger on such divider wall, and in coaction with the duct work, for furnishing the heated cooking medium t the chamber 74 of the duct finger, and thence upwardly through the associated jet plate to impinge against the underside of the conveyor 26 for cooking food product thereon.

Referring now to FIGS. 26 through 28, there is shown a columnating plate 84 which is a member of generally U-shaped configuration in end elevation (FIG. 28) and which has a plurality of openings 86 formed therethrough, only a portion of which openings are illustrated, with the openings being disposed in rows lengthwise of the plate, with the holes in alternate rows being staggered, with respect to one another, and as shown. The columnating plate has shoulder portions 84a which are adapted to be mounted on the open top 68 of the lower duct finger and the open bottom 60 of the upper duct finger 38, with the apertured body of the columnating plate being removably disposed within the chamber 74 and 48 defined by the respective duct finger.

Referring now to FIGS. 29 through 33, there is illustrated one of the aforementioned jet plate members 90 which likewise consists of an apertured plate member with the apertures 92 therein disposed in the same general pattern as the apertures 86 in the respective columnating plate 84.

Each of the apertures 92 in jet plate 90 is formed so as to provide a nozzle 94 (FIG. 33) thus insuring that the cooking medium streaming out of the spaced openings 92 in the jet plate of the respective duct finger, is directed in jet form onto the confronting conveyor surface.

As can be best seen from FIGS. 31 and 32, the jet plate 90 is open at one end, as at 96, and is closed at the other end by an end wall 98 (the left hand end as viewed in FIG. 29). The open end of the jet plate is adapted to coact with the tab 51 or 82 on the respective upper duct finger or respective lower duct finger.

The side walls 100 of the jet plate member 90 are slotted as at 102 for coaction with the aforementioned headed pins 58 on the side walls of respectively the upper duct finger and the associated lower duct finger. The openings 86 in the columnating plate and the openings 92 in the spaced jet plate for each of the duct fingers are adapted to be generally aligned with one another when assembled on the respective duct finger, so that the heated gaseous medium flowing from the respective duct finger chamber through the columnating plate and the coacting spaced jet plate is directed in jet stream form toward the confronting surface of the pervious conveyor. Jet plate 90 may have a tab 104 on the outer end thereof for aiding in installing and removal of the jet plate on the respective duct finger.

Referring now again to FIGS. 3 and 4, it will be seen that the aforementioned suction fans 32 draw the moisturized heated gaseous medium produced by heater 28 up via the suction side 33 of each fan, passing it out the pressure side of the fan into the plenum 34 which has a plurality of elongated baffle means 105 formed therein, for directing the gaseous medium downwardly through the plenum chamber 34 and toward the lower elevation upper and lower series of duct fingers 38 and 40. There is also preferably provided in plenum chamber 34, at least one elongated movable baffle 106 pivotally mounted therein on the structure of wall 36 and coupled by a control rod or rods 108 to exteriorly of the plenum chamber 34 (and into the heating chamber 20 or even exteriorly of the oven) for adjusting the quantity of heated cooking medium being directed either to the upper duct finger assemblies 38 or the lower duct finger assemblies 40.

Referring now to FIGS. 5 through 10, there is illustrated the upper portion 110 (FIGS. 8, 9 and 10) of the aforementioned divider wall 36 and also the lower portion 112 (FIGS. 5, 6 and 7) of such divider wall. The upper portion 110 has downwardly extending spaced panels 118, each of which is preferably provided with a plurality of vertically spaced slots 114 therein, for providing for adjusting the elevation of the respective upper duct finger 38 which is adapted to be mounted thereon, utilizing the aforementioned hook 50 on the respective duct finger in a respective slot 114.

It will be seen that by selective positioning of the hook 50 in a selected one of slots 114, the elevation of each upper duct finger 38 can be varied, and thus the distance between the jet plate of the respective upper duct finger is varied from the confronting surface of the associated conveyor, thus adapting the oven mechanism for cooking many different types of food products therein. Openings 116 in the upper portion 110 of the divider wall 36 provide for receiving therethrough the aforementioned control rod 108 for controlling the position of the baffle 106 running lengthwise of the plenum chamber 34.

As can be seen from FIGS. 9 and 10, between each of the downwardly projecting panel projections 118 on upper section 110 of the divider wall, there are provided rearwardly extending duct work sections 120 (FIGS. 3, 4, 9 and 10) which are adapted for coaction with the rearwardly extending portions of side walls 42 of the respective upper duct fingers 38 for aiding in supporting and positioning the upper duct fingers on the divider wall 36, with the gaseous cooking medium passing through the open spaces 121 between duct work portions 120 into the chamber 48 of the respective upper duct finger. Such duct sections 120 also provide means for hinging the aforementioned baffle plate 106 in the plenum chamber 34 and as at 122, such baffle plate preferably extending the length of the divider wall 36.

Referring now particularly to FIGS. 5, 6 and 7, the lower portion 112 of the divider wall 36 likewise has a series of duct members 124 projecting forwardly outwardly from the plane of the upper portion thereof which ducts 124 are adapted for coaction with a respective lower duct finger 40, and as can be best seen in FIGS. 3 and 4, with the outer end of the respective duct portion 124 being received in telescoped condition within the open right hand end 70 (as viewed in FIGS. 4 and 11) of the respective lower duct finger. Duct portions 124 also provide spaced supports 126 for one side of the upper run of the mesh belt of the aforementioned conveyor 26, and as can be best seen in FIGS. 4, 5 and 6. Lower divider wall portion 112 also comprises a plurality of vertically spaced openings 128 therein spaced lengthwise of wall portion 112, for receiving the respective aforementioned pin 54 on the rear end wall 47 of the respective upper duct finger 38 for mounting and positioning the latter on the divider wall 36, and as best seen for instance in FIG. 4. It will be understood that divider wall 36 is welded or secured in the oven to provide the completely separate cooking chamber 20 and plenum chamber 34 in the oven enclosure, and joins with lower extension panel 129 and upper panel extensions 129a to so provide such separate chambers 20 and 34.

Figure 25:
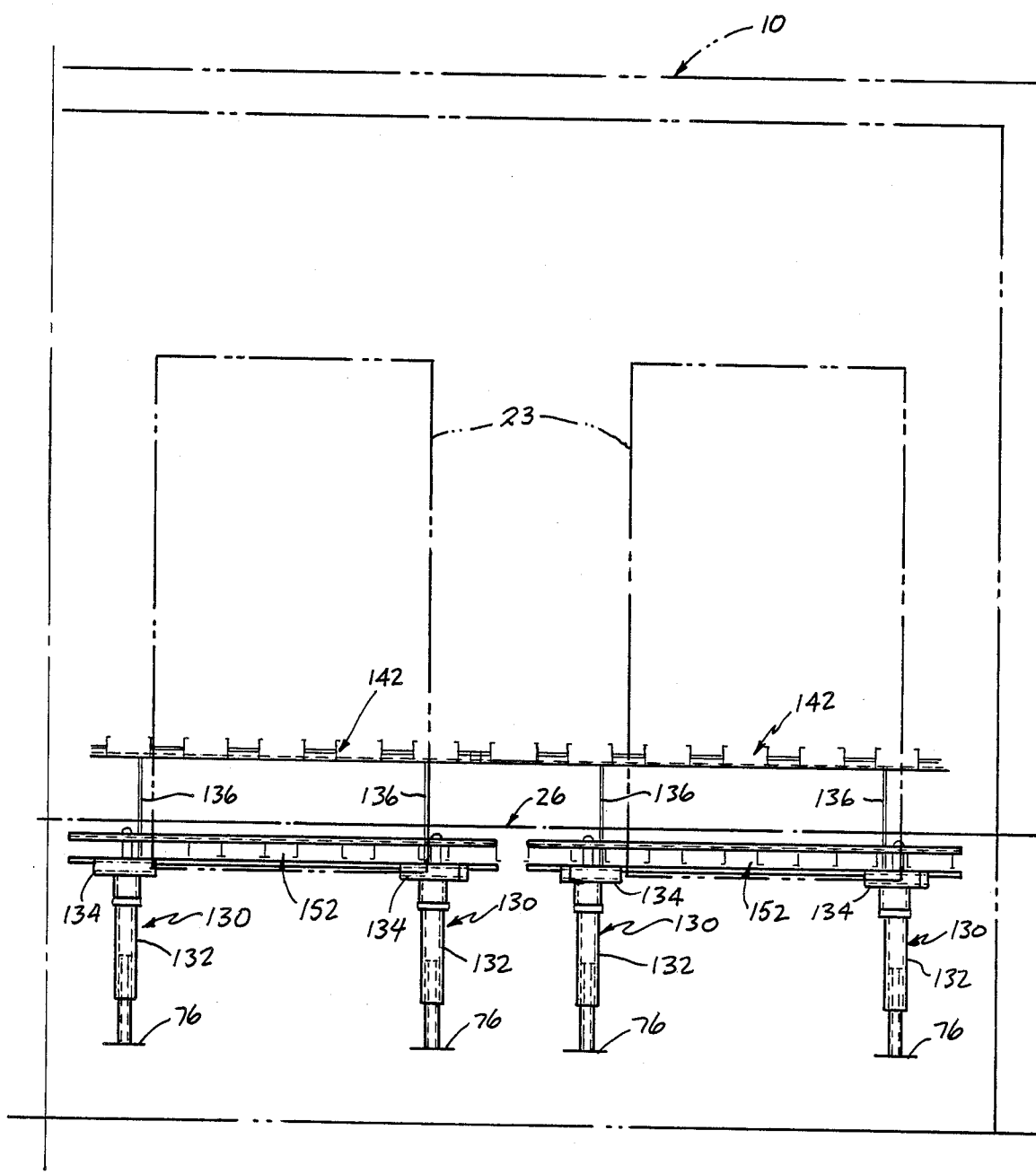
FIG. 25 is a fragmentary, generally diagrammatic illustration of the support structure of FIGS. 23 and 24 taken from the right hand side of FIG. 4, and also illustrating in phantom lines the location of certain of the access doors to the interior of the oven enclosure.

Referring now particularly to FIGS. 23 to 25, inclusive, in conjunction with FIG. 4, there is illustrated support structure 130 preferably provided in the oven for supporting and restraining the outer or distal ends of the duct fingers 38 and 40. Such support structure comprises, in the embodiment illustrated, adjustable length posts 132 which may be supported on the aforementioned bottom sloping surface 76. Each post132 has pivotally mounted thereto as by means of rotatable trunnions 134 an L-shaped (in elevation) link 136 which is slotted as at 138, and which adjustably mounts bracket structure 140 thereon, as by means of nuts and bolts 140a. Adjustably attached to bracket 140 is a track 142 (FIGS. 23 and 34 to 36) which is secured as by means of nuts and bolts 142a and projecting attaching portions 142b of the track to bracket 140. Track 142 has a plurality of spaced prongs 144 thereon (FIGS. 34 and 35) between each pair of which is adapted to be received on shelf portion 146 of the track, the associated upper duct finger 38, for supporting the associated plurality of duct fingers in generally horizontal condition in the oven cooking chamber and for restricting lateral movement thereof. It will be seen that by loosening nuts and bolts 142a the supporting track structure can be moved rearwardly from coaction with the upper duct fingers, at which time removal of the pins 148 on the trunnions, will permit outward pivotal movement of the bracket structure 136, thus releasing the outer support from the associated upper duct fingers.

Support structure 130 also may include bracket structure 150 having elongated support track with upstanding prongs 152 supported thereon which is adapted to receive between pairs of the prongs thereof a series of the lower duct fingers 40, for supporting the lower duct fingers and restricting lateral movement thereof in a manner similar to that provided by track 142. Also releasable, elongated bracket structure 154 may be provided for bearing against the outer end wall 66 of the lower duct fingers 40, and as illustrated in FIGS. 23 and 24, for preventing inadvertent outward movement of the lower duct fingers away from supporting divider wall 36.

It also will be seen that the support structure 130 provides, in the embodiment illustrated, the supports 156 for the outer side of the conveyor mechanism 26, by means of bracket structure 156a and horizontal projections 156b supported on bracket structure 156a, for supporting the outer side of the mesh belt of the conveyor mechanism as it travels from the inlet to the outlet of the oven. Support structure 156 coacts with the aforementioned support structure 126 on the opposite side of the conveyor belt, and mounted on the lower portion 112 of the divider wall 36 (as best illustrated in FIGS. 5, 6 and 7) for supporting the upper run of the conveyor in the oven.

Referring now particularly to FIGS. 40 and 41, there are shown sealing arrangements utilizable with the aforementioned access doors 22 and 23 in the oven, for insuring a good seal of the doors when in closed and latched condition. Such sealing arrangement comprises gasket means 160 mounted on the respective door and extending thereabout, and adapted for abutting engagement with the confronting surface of the associated opening in the wall which the door is adapted to close. A source of air pressure 162 is provided for exerting predetermined pressure on the gasket means to force the flexible and continuous gaskets into sealing relationship between the door structure and the confronting surface of the opening. The source of pressure can be provided by means of an air compressor (not shown) attached to suitable passageway means disposed in the wall structure of the oven and communicating with the aforementioned opening between the associated flexible gaskets 160. FIGS. 40 and 41 show two arrangements of doors (one for a tapered opening and one for an off-set opening) but the sealing means for both door structures are essentially the same, and overcomes the tendency of the internal pressure in the oven as provided by fans 32, to be able to leak past the access doors.

Referring now in particular to FIGS. 37, 38 and 39, there is shown an oven assembly embodiment which utilizes the afore described oven of FIGS. 1 through 36, but wherein a plurality of such ovens are disposed in generally tandem relation, as illustrated, with the exit end of one oven disposed in confronting relation with the inlet end of the forwardly adjacent oven. Thus any desired number of ovens can be placed in tandem relationship to accomplish a cooking cycle for almost any type of food product. The ovens 10 and associated conveyor mechanism 26' are preferably so arranged that the endless conveyor belt of the conveyor mechanism extends through all of the aligned ovens so that the food product can be automatically transferred by the conveyor mechanism from the exit end of one oven into the inlet end of the next adjacent oven. There also may be and preferably are provided enclosure or tunnel means 168 encompassing the conveyor connection between adjacent ovens for protecting the food product being transferred, together with removable cover means 168a on such tunnel means for providing ready access to such connecting conveyor structure. As can be best seen in FIG. 37 such conveyor mechanism 26' preferably embodies one continuous conveyor belt rather than a series of individual conveyor belts. The inlet end 16 of the FIGS. 37 through 39 embodiment and the outlet end, may likewise be provided with exhaust stack structure 170 coacting therewith in the conventional manner and as aforementioned in connection with the individual oven structure.

Figure 43:
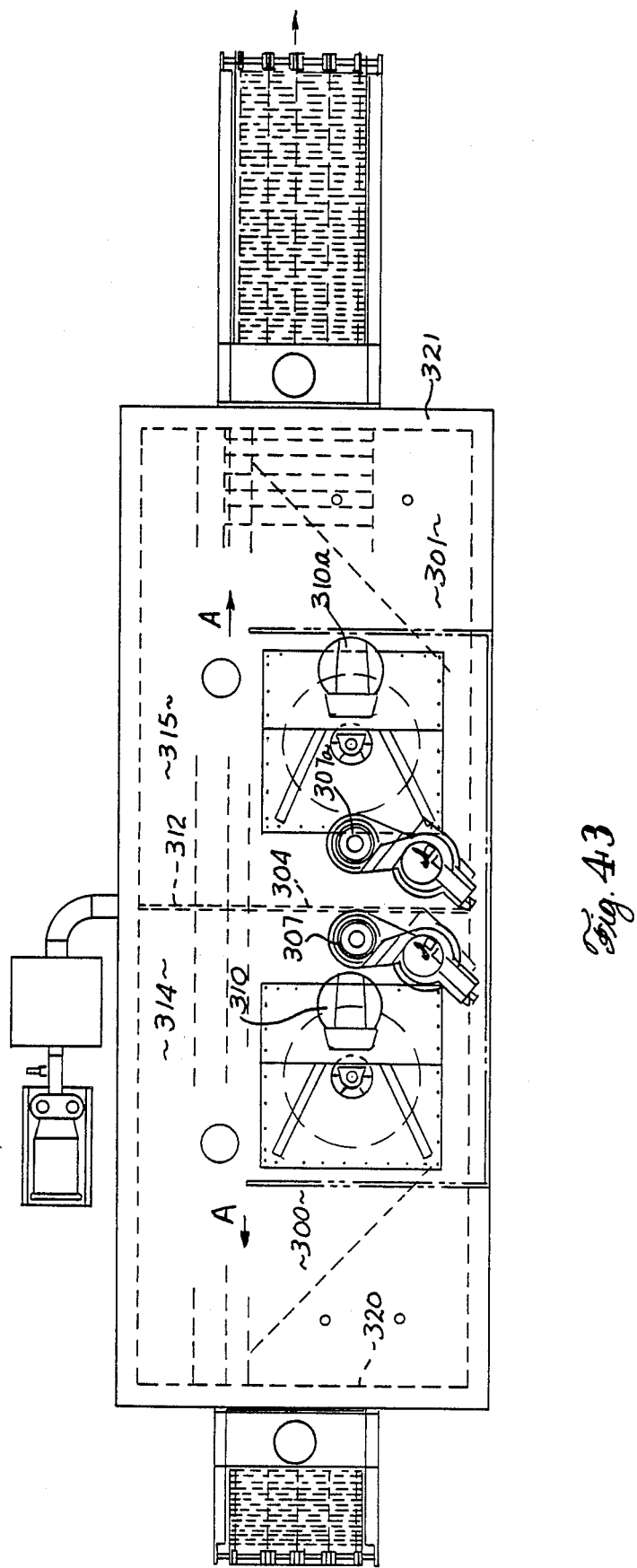
FIG. 43 is a top plan view of the oven of FIG. 42.
Figure 44:
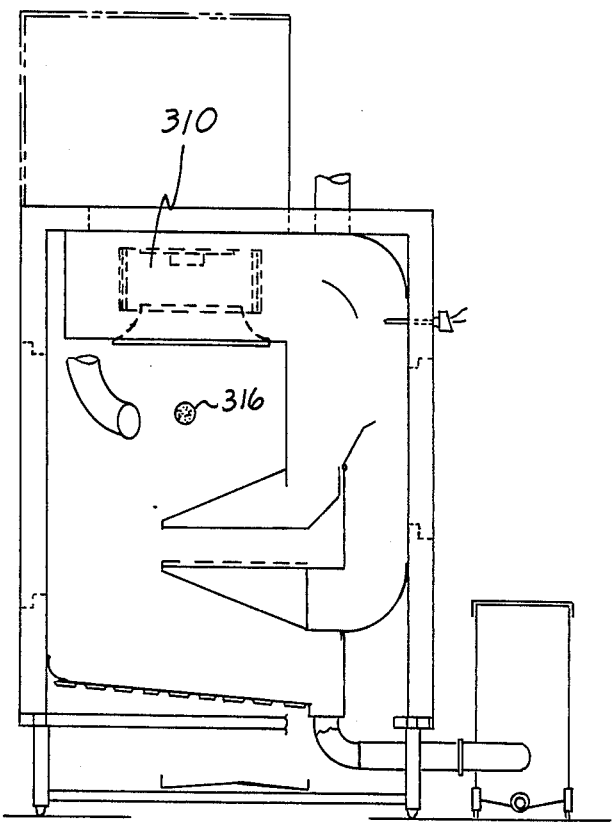
FIG. 44 is a side elevational view of the oven of FIG. 42.

Referring to FIGS. 42-44, another embodiment of oven is disclosed. In this embodiment, the oven interior is divided into two separate cooking chambers 300 and 301 separated by a vertically disposed baffle wall 304. This baffle wall is solid excepting for opening 305 through which extends the upper run of conveyor belt 306.

Each cooking chamber thus formed is provided with its own source of heat (gas heater 307, 307a, respectively) and a separate fan 310, 310a for providing the heated air flow into each cooking chamber. As seen in FIG. 43, the plenum chamber is divided by wall 312 into two separate plenum chambers 314, 315. As best seen in FIG. 44, a separate source of moisture 316 is also provided in each said cooking chamber 300, 301.

With this structure, separate moisturized heated medium may be supplied to each cooking chamber 300, 301 independently of each other whereby, if desired, the heated medium supplied to one chamber may be at a higher or lower temperature or a different moisture content than that supplied to the other chamber. In like manner, the fan 310, 310a in each chamber may be a conventional variable speed controlled fan so as to provide a variably controlled volume of heated medium into its respective cooking chamber.

As best seen in FIG. 43, with this oven structure, the heated air as it exits from the duct fingers 38 in each chamber 300, 301 tends to flow in the direction of the arrow A or toward the opening in the end wall 320, 321 of its associated chamber. This air flow tends to provide a relatively positive pressure within the oven at each end of each chamber 300, 301.

In the oven structure of FIGS. 1 and 2, the air flow as indicated by the arrow B in cooking chamber 20 after exiting from the duct fingers 38 in the left portion of the chamber is toward the inlet opening 16 whereas the air flow after exiting from the duct fingers 38 in the right portion of the cooking chamber 20 is also in the direction of the arrow B which is away from the outlet opening 18. This air flow tends to create a relative positive pressure within the cooking chamber 20 at the inlet 16 and a relative negative pressure at the outlet 18.

The embodiments of oven disclosed herein operate within the following parameters.

The velocity of the jet stream of heated medium exiting from each duct finger is within the range of 4000–5000 feet per minute. The temperature of the heated medium is within the range of 200° F. to 700° F. and preferably within the range of 450° F. to 500° F.

The linear velocity of the conveyor belt carrying the food product is selected and determined so as to provide the proper cook time with the selected temperature of the cooking medium. Typical cook times may vary within the range of 0.5 minute to 30 minutes.

The content of moisture in the cooking medium is likewise selected to provide the desired moisture content to the food product being processed. With respect to the door seals, the air pressure provided to the cavity between the seals 24, 160 is preferably 20 pounds per square inch.

From the foregoing description and accompanying drawings, it will be seen that the invention provides a novel food cooking oven defining a substantially closed enclosure except for comparatively small inlet and outlet openings in the end walls of the enclosure, and with the enclosure defining a cooking chamber for receiving food product therein together with means for conveying food product through the cooking chamber from the inlet thereto and exiting through the outlet thereof. Heating means extend through the top wall of the enclosure for providing a gaseous cooking medium and a source of moisture such as steam sprayer means is disposed between the heater outlet in the cooking chamber, and in combination with fan means on either side of the heater outlet and moisture providing means for sweeping the moisturized heating medium upwardly out of the cooking chamber and then forcing it downwardly in another chamber separate from the cooking chamber, and directing such moisturized cooking medium to a plurality of spaced duct fingers disposed in the cooking chamber above and below the conveyor means for applying jets of the cooking medium to the pervious conveyor means and thus to food product on the conveyor.

The invention also provides numerous other novel features for a convection type cooking oven for expediting the mass production of cooked food product, and an oven wherein certain parts thereof are expeditiously removable from the cooking chamber thereof, and one that is able to be readily cleaned.

The terms and expressions which have been utilized are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. A food cooking oven comprising top and bottom walls, side walls and end walls defining a substantially closed vapor leak proof enclosure except for an inlet and an outlet in said end walls, said enclosure defining a cooking chamber for receiving food product therein, means for conveying food product through said chamber from said inlet and exiting through said outlet, heater means extending through said top wall for heating a gaseous medium and directing it into said chamber, suction fan means on said top wall on either side of said heater means and with the suction side of said fan means being in relatively closely spaced relation from the outlet of said heater means in said chamber, a source of moisture disposed between said heater means outlet and said suction side of each said fan means in said chamber for mixing moisture with the heated medium from said heater means in said chamber, means disposed above and below said conveying means for directing streams of gaseous medium to opposite sides of said conveying means for cooking food products thereon, a second chamber separate from said cooking chamber and in communication with the pressure side of each said fan means and connected with the fourth mentioned means for directing the mixture of heated gaseous medium and moisture withdrawn from said cooking chamber by said fan means to said fourth mentioned means.

2. An oven in accordance with claim 1 wherein said fourth mentioned means comprises a plurality of generally horizontally spaced duct fingers disposed in said cooking chamber and communicating with said second chamber by duct means.

3. An oven in accordance with claim 2 wherein said duct means is located on vertical wall means defining in part said cooking chamber.

4. An oven in accordance with claim 2 including baffle means coacting with said second chamber for varying the flow of heated gaseous medium and moisture to respectively upper duct fingers and lower duct fingers comprising said duct fingers.

5. An oven in accordance with claim 2 wherein each of said duct fingers is mounted at one end thereof to said duct means, and support means being provided on the other end thereof for supporting said duct fingers generally horizontally in said cooking chamber.

6. An oven in accordance with claim 2 including upper duct fingers and lower duct fingers disposed respectively above and below said conveyor means, and means providing for adjusting the elevation of at least certain of said duct fingers with respect to said conveying means whereby the gaseous medium emitted from said duct fingers can be located closer or further from the confronting surface of said conveying means.

7. An oven in accordance with claim 2 wherein said second chamber consists of a plenum defined in part by generally vertically extending wall means spaced from a respective one of said side walls of said enclosure, said vertically extending wall means also defining in part said cooking chamber and supporting said duct fingers thereon, and duct means projecting outwardly from said vertically extending wall means and coacting with the respective of said duct fingers for directing heating medium from said plenum to the respective duct fingers.

8. An oven in accordance with claim 7 wherein said duct fingers include upper duct fingers and lower duct fingers disposed respectively above and below said conveyor means, said duct means coacting with said upper duct fingers and said duct means coacting with said lower duct fingers being staggered with respect to one another in a direction lengthwise of said oven whereby said upper and lower duct fingers are likewise staggered with respect to one another in a direction lengthwise of said oven.

9. An oven in accordance with claim 7 including exhaust means coacting with said plenum for exhausting heating medium therefrom, and baffle means in said exhaust means for restricting fluid flow therethrough.

10. An oven in accordance with claim 7 wherein said duct fingers include upper duct fingers and lower duct fingers disposed respectively above and below said conveyor means, and including baffle means in said oven coacting in said plenum with the respective upper and lower duct fingers for selectively adjusting the amount of flow of cooking medium from said plenum to either the upper or the lower duct fingers.

11. An oven in accordance with claim 2 including drain means on the lower duct fingers for draining drippings introduced therein from product on the conveyor means.

12. An oven in accordance with claim 2 wherein certain of said duct fingers are open in the lengthwise direction thereof at the top thereof and including jet plate means having a plurality of orifices formed therein mounted on the respective said duct finger for producing jet streams of cooking medium toward the confronting surface of said conveying means.

13. An oven in accordance with claim 12 including columnating means coacting with said jet plate means for aiding in producing and directing the streams of cooking medium toward the confronting surface of the conveying means.

14. An oven in accordance with claim 12 including projecting means on the sides of the respective duct finger and slot means in said jet plate means adapted for coaction to removably secure the respective jet plate means to the respective duct finger.

15. An oven in accordance with claim 2 including means for supporting said duct fingers in said oven, said support means comprising a column, a bracket supported on said column, and support means projecting from said bracket and adapted for coaction with the distal ends of said duct fingers for supporting the latter in said oven.

16. An oven in accordance with claim 15 wherein said support means is adjustable for adapting the same to different elevational heights of said duct fingers.

17. An oven in accordance with claim 2 wherein each of certain of said duct fingers includes a clip adapted for coaction with a slot in a confronting support surface in said oven for mounting the respective duct finger on the confronting surface of the oven.

18. An oven in accordance with claim 2 wherein said fourth mentioned means are expeditiously removable from said cooking chamber for facilitating cleaning of said oven.

19. An oven in accordance with claim 1 wherein said bottom wall is liquid tight for holding and directing drippings from the food products outwardly of said oven through a drain therein.

20. An oven in accordance with claim 1 wherein the interior of said oven is comprised of stainless steel.

21. An oven assembly comprising the oven of claim 1 and wherein a plurality of said oven are disposed in generally tandem relation, and said conveyor means connecting the exit end of one oven with the inlet end of the confronting oven, for transferring food product from one oven to the next adjacent oven.

22. An oven assembly in accordance with claim 21 including tunnel means encompassing the last mentioned means between said ovens and providing selective access to said last mentioned means.

23. An oven in accordance with claim 1 wherein said top, bottom, side and end walls of said oven embody a layer of insulation, except for said inlet and said outlet openings.

24. An oven in accordance with claim 1 and wherein means in said enclosure divide the interior into two separate cooking chambers.

25. An oven in accordance with claim 24 and wherein each cooking chamber is provided with heater means, fan means and a source of moisture.

26. An oven in accordance with claim 25 and wherein the heater means of each cooking chamber may be operated to selectively provide a heating medium of a temperature different from the temperature of the heating medium in the other said cooking chamber.

27. An oven in accordance with claim 25 and wherein the fan means in each cooking chamber is variably controllable to provide a velocity of heated medium in each said cooking chamber that is selectively different from the velocity of heated medium in the other said cooking chamber.

28. An oven in accordance with claim 25 and wherein the source of moisture in each said cooking chamber may be selectively operable to provide a moisture content to the heated medium in one of said cooking chambers that is different from the moisture content of the heated medium in the other of said cooking chambers.

29. An oven in accordance with claim 1 including openings in said side walls, and doors normally closing said openings but when open providing access to the interior of said enclosure, and sealing means coacting between said side walls and said doors for sealing the doors against egress of pressurized cooking medium from interiorly of the oven.

30. An oven in accordance with claim 29 wherein said sealing means includes a source of pressurized air for urging gasket means coacting between said doors and said side walls into tight sealing condition.

31. A method of cooking food products in an oven including a substantially closed vapor leak proof elongated enclosure having an inlet and an outlet in opposite end walls of the enclosure, and including pervious conveyor means for conveying food product through the cooking chamber in said enclosure from said inlet and exiting through said outlet, comprising providing a source of heated gaseous cooking medium and directing it into the upper portion of said cooking chamber via duct means, applying moisture in said cooking chamber to said cooking medium closely adjacent to the exit end of said duct means and then sucking by fan means communicating with said cooking chamber in relatively closely spaced relation to the entry of the heated cooking medium into said cooking chamber, the moisturized cooking medium upwardly form said cooking chamber into another chamber separate from but adjacent to said cooking chamber, then forcing the moisturized cooking medium downwardly via said other chamber to lower disposed duct finger members disposed above and below said conveyor means and through jet means thereon toward the respective confronting surface of said conveyor means to cause impingement of jet streams of the gaseous cooking medium on the food product adapted to be moved through the oven on said conveyor means, and then recirculating the impinging cooking medium form said cooking chamber back to the other chamber via said fan means for reintroduction into the finger members.

32. A method in accordance with claim 31 including adjusting the position of certain of the duct finger members relative to said conveyor means to vary the spacing between said certain duct finger members and the confronting surface of said conveyor means.

33. A method in accordance with claim 31 including providing baffle means in said other chamber and adjusting the position of said baffle means to vary the quantity of cooking medium flowing to said duct finger members.

* * * * *